United States Patent Office 3,076,790
Patented Feb. 5, 1963

3,076,790
METHOD OF MAKING COPOLYMERS OF AMINO ACIDS CONTAINING GLUTAMIC ACID
Sidney W. Fox, 1114 Waverly Road, and Kaoru Harada, 662 W. Call St., both of Tallahassee, Fla.
No Drawing. Filed Aug. 1, 1958, Ser. No. 752,403
4 Claims. (Cl. 260—78)

This invention concerns amino acid copolymers containing combined glutamic acid together with one or more other neutral and basic α-amino carboxylic acids, and their method of preparation.

The art is replete with unsuccessful attempts to heat-polymerize natural amino acids to form polypeptides.

It has now been discovered that copolymers containing combined glutamic acid and one or more other neutral and basic α-amino carboxylic acids can be prepared by heat-polymerizing glutamic acid or pyroglutamic acid (the lactam of glutamic acid) together with a balance of one or more other neutral and basic α-amino carboxylic acids at a reaction temperature between about 140° and 210° C., advantageously in the presence of a sufficient proportion (preferably equimolar) of concentrated, e.g. about 85 weight percent or higher, phosphoric acid to facilitate reaction and in the presence of an inert atmosphere, advantageously carbon dioxide or nitrogen. The resultant copolymer is a polypeptide. The molecular weight of the condensation polymers so obtained increases as the temperature or time of reaction is increased.

In practice, the mixture of amino acids is heated to temperatures ranging from about 140° to about 210° C., advantageously in an oil bath, for a time sufficient to give a product of the desired molecular weight, advantageously from about 15 minutes to about 24 hours. The addition of an equimolar amount or less of 85 percent or higher phosphoric acid, amino acid basis, facilitates reaction so that a lower reaction temperature can be used. The use of phosphoric acid also promotes the formation of higher molecular weight polymers and usually gives higher yields. However, the reaction is operable in the absence of added phosphoric acid, although a starting temperature about 20° C. higher, i.e., 160° C., is required in the absence of phosphoric acid. Also, the prior heating of glutamic acid to form a melt of pyroglutamic acid has also been found to expedite the reaction.

Analyses of the obtained products include end-group assay, average molecular weight, and total amino acid composition (by hydrolysis and chromatography of 2,4-dinitrophenyl derivatives).

The products of this invention yield continuous films from water solutions which are useful for temporary protection at low humidities. The films can be removed by a water wash.

The following examples illustrate specific embodiments of this invention.

EXAMPLE 1.—COPOLYMERIZATION OF GLUTAMIC ACID AND OTHER AMINO ACIDS

In the following tabulated cases, glutamic acid, L- or DL- together with another amino acid in equimolar amount were ground together, then heated, typically for 30–120 min. at 160°–190° C. The cooled product was treated with 5 or 10 ml. of water. In most cases all of the product dissolved. The resulting solution was subjected to the biuret test with 10 volumes of one-normal NaOH and several drops of 0.3 percent $CuSO_4$ solution. In other cases, the glutamic acid was first liquefied as the lactam (pyroglutamic acid) by heating, typically for 30 min. at 180° C., and the other component was then added in equimolar ratio. Heating was continued usually for 50 min. in the range of 160°–180° C. All of the results are in the following Table I.

*Table I*
BIURET RESPONSES OF TWO OR MORE REACTANTS FOLLOWING HEATING

| Reactants | Biuret response[c] |
|---|---|
| Glutamic acid plus glycine [a] | + |
| Glutamic acid plus glycylglycine [a] | + |
| Glutamic acid plus diketopiperazine [a] | + |
| Pyroglutamic acid plus glycine [a] | + |
| Pyroglutamic acid plus diketopiperazine plus water [b] | + |
| Glutamic acid plus asparagine | + |
| Pyroglutamic acid plus alanine | + |
| Pyroglutamic acid plus valine | + |
| Pyroglutamic acid plus leucine | + |
| Pyroglutamic acid plus phenylalanine | + |
| Pyroglutamic acid plus lysine monohydrochloride | [d] + |
| Pyroglutamic acid plus leucine plus glycine [a] | + |
| Pyroglutamic acid plus proline plus glycine [a] | + |
| Pyroglutamic acid plus lysine monohydrochloride plus glycine | + |
| Pyroglutamic acid plus lysine monohydrochloride plus cystine | + |
| Pyroglutamic acid plus lysine monohydrochloride plus glycine plus cystine | + |

[a] On addition of water to the product, a biuret-positive precipitate separated.
[b] 100 mg. of each reactant, plus few drops of water.
[c] A positive biuret is indicative of peptide.
[d] Intensely.

EXAMPLE 2.—COPOLYMERIZATION OF GLUTAMIC ACID AND GLYCINE

A quantity of 1.65 g. (0.01 mole) of DL-glutamic acid monohydrate was ground with 1.51 g. (0.02 mole) of glycine in a mortar. The mixture was heated in an open test tube in an oil bath at 175°–180° C. The mixture melted slowly and evolved a gas which turned litmus blue. When evolution of gas virtually ceased after 50 min., the heating was terminated and the brown liquid solidified on cooling. To this was added 10 ml. of water with rubbing, whereupon a white to gray solid separated. After overnight standing, the solids were centrifuged and washed with 10 ml. of water and then with 10 ml. of ethanol. The dried polymer weighed 0.29 g. and gave an intense biuret reaction, as did the mother liquor. The solid was suspended and dialyzed for several days and then dried in a vacuum dessicator. A gelatin-like film was deposited, yield 0.09 g., the average molecular weight of which was 16,000. Conducting the reaction under carbon dioxide or preferably nitrogen minimized coloration which appeared mainly at the surface.

EXAMPLE 3.—COPOLYMERIZATION OF PYROGLUTAMIC ACID AND GLYCINE

A polymerization was carried out for 4½ hr. at 170° C. under $CO_2$ with 44.1 g. (0.03 mole) of L-glutamic acid (preheated for 60 min. at 180° C.) and 56.3 g. (0.75 mole) of glycine. The total yield of slightly colored polymer was 18.2 g. after dialysis. It was difficultly soluble in water and organic solvents, and soluble in dilute aqueous sodium bicarbonate solution. Its infrared absorption maxima were similar to those of proteins: 3300, 3080, 1690, 1650, 1550, 1250 $cm.^{-1}$. The components recovered after acidic hydrolysis were biuret-positive and ninhydrin-negative.

EXAMPLE 4.—GLUTAMIC ACID-GLYCINE COPOLYMERS

In the reactions described in the following Table II, the heating was conducted in open test tubes. After heating, the cooled product was treated with 10 ml. of water, left standing overnight, separated by centrifugation, and washed with 10 ml. each of water and ethanol. Dialysis was conducted in conventional cellophane tubing for 5 days with agitation of continuously changing water bath by a magnetic stirrer.

Table II
YIELDS, TOTAL COMPOSITIONS AND N-TERMINAL COMPOSITIONS OF GLUTAMIC ACID-GLYCINE POLYMER

| Moles and form of glutamic acid | Moles of glycine | Temp., °C. | Time of heating, min. | Yield of polymer | | Total composition | | N-Terminal | |
|---|---|---|---|---|---|---|---|---|---|
| | | | | Before dialysis, g. | After dialysis, g. | Glutamic acid, mol. percent | Glycine, mol. percent | N-glutamic acid/ΣN-amino acid, mol. percent | N-Glycine/ΣN-amino acid, mol. percent |
| 0.01 DL | 0.02 | 175–180 | 50 | 0.29 | 0.09 | (¹) | (¹) | (¹) | (¹) |
| 0.01 L | 0.02 | 175–180 | 50 | 0.29 | 0.09 | 23.4 | 76.6 | 24 | 76 |
| 0.01 L | 0.03 | 175–180 +185 | 60 10 | 0.55 | 0.28 | 20.2 | 79.8 | 17 | 83 |
| 0.02 ᵃ | 0.04 | 175 | 60 | (¹) | 0.11 | (¹) | (¹) | (¹) | (¹) |
| 0.02 ᵃ | 0.06 | 175 | 60 | (¹) | 0.55 | (¹) | (¹) | (¹) | (¹) |

¹ Not determined.
ᵃ Pyroglutamic acid from L-glutamic acid.

INFRARED ABSORPTION MAXIMA OF POLY (GLUTAMIC ACID-GLYCINE) ¹

| Absorption band, Cm⁻¹ | Interpretation |
|---|---|
| 3,300 | NH—stretching. |
| 3,080 | Do. |
| 1,690 | CO of COOH. |
| 1,650 | CO stretching, amide I. |
| 1,550 | NH deformation, amide II. |
| 1,250 | Amide III. |

¹ On basis of 23.4 glutamic acid: 76.6 glycine, as reported in Table II.

NOTE.—The spectra show that the material has a typical linear polypeptide structure, and is not a diketopiperazine.

EXAMPLE 5.—COPOLYMERIZATION OF GLUTAMIC ACID AND GLYCINE
[Temperature vs. mol. wt.]

| Temp., °C.ᵃ | Yield of polymer | | Nondiffusible polymer (A)/ total polymer, weight percent | Glutamic acid content of A, mol. percent | Glycine content of A, mol. percent | Ave. mol. weight of A | N-terminal | |
|---|---|---|---|---|---|---|---|---|
| | Before ᵇ dialysis, g. | After ᶜ dialysis, g. | | | | | N-glutamic acid/Σ N-amino acid, mol. percent | N-glycine/Σ N-amino acid, mol. percent |
| 160 | 0.06 | Trace | | | | | | |
| 170 | 0.60 | ᵈ0.37 | 6.17 | 24.1 | 75.9 | 15,500 | 23 | 77 |
| 180 | 0.68 | ᵉ0.47 | 69.2 | 25.5 | 74.5 | 17,500 | 21 | 79 |
| 190 | 0.70 | ᶠ0.57 | 81.4 | 25.7 | 74.3 | 20,000 | 19 | 81 |

ᵃ L-glutamic acid (0.01 mole) was heated at 180°C. for 30 min., treated with 0.025 mole of glycine in an open tube with heating for 60 min, in an oil bath at the temperature given.
ᵇ The reaction mixture was taken up in 10 ml. of water, let stand overnight, separated at the centrifuge and washed with 10 ml. of water and 10 ml. of ethanol.
ᶜ After drying in vacuum desiccator following 7 days of dialysis.
ᵈ Yellow film, useful as water-removable protective film at low humidities.
ᵉ Grey film, useful as water-removable protective film at low humidities.
ᶠ Grey-black film, useful as water-removable protective film at low humidities.

EXAMPLE 6.—COPOLYMERIZATION OF GLUTAMIC ACID AND GLYCINE

| Reaction time,ᵃ hr. | Overlaying atmosphere | Yield of polymer | | Nondiffusible polymer (A)/ total polymer weight percent | Glutamic acid content, mol. percent | Glycine content, mol. percent | N-Terminal | |
|---|---|---|---|---|---|---|---|---|
| | | Before dialysis, g. | After dialysis, g. | | | | N-glutamic acid/Σ N-amino acid, mol. percent | N-glycine/Σ N-amino acid, mol. percent |
| ½ | CO₂ | 0.25 | ᵇ0.12 | 48 | 22.6 | 77.4 | (¹) | (¹) |
| 1 | CO₂ | 0.52 | ᶜ0.39 | 75 | 27.1 | 72.9 | 20 | 80 |
| 2 | CO₂ | 0.62 | ᵈ0.51 | 82 | 26.7 | 73.3 | 19 | 81 |
| 4 | CO₂ | 0.80 | ᵉ0.71 | 89 | 33.2 | 66.8 | 17 | 83 |
| ½ | Air | 0.26 | ᵇ0.04 | 15 | (¹) | (¹) | (¹) | (¹) |
| 1 | Air | 0.43 | ᵈ0.15 | 35 | (¹) | (¹) | (¹) | (¹) |
| 2 | Air | 0.63 | ᵉ0.32 | 51 | (¹) | (¹) | (¹) | (¹) |

ᵃ All mixtures contained 0.01 mole of L-glutamic acid which was heated at 180°C. then treated with 0.025 mole of glycine at 170° C. for the time given, then processed as in Example 5.
ᵇ Almost colorless film.
ᶜ Slightly grey film.
ᵈ Grey film.
ᵉ Dark grey film.
¹ Not determined.

EXAMPLE 7.—EFFECT OF PHOSPHORIC ACID ON REACTION BETWEEN 0.01 MOLE ASPARTIC ACID AND 0.01 MOLE GLUTAMIC ACID, ONE HOUR REACTION TIME

| Temp., °C. | Yields after dialysis, g. | | |
|---|---|---|---|
| | Without H₃PO₄ | With H₃PO₄ | Avg. mol. weight |
| 150 | 0 | 0.44 | |
| 160 | Trace | 1.61 | |
| 170 | 0.89 | 1.76 | 6,740 |
| 180 | 1.21 | 2.09 | 11,800 |
| 190 | 1.32 | 2.13 | 12,300 |
| 200 | 1.86 | 2.14 | 33,600 |
| 210 | 1.95 | 2.18 | 25,600 |

NOTE.—An equimolar proportion of aqueous 85 weight percent H₃PO was used, amino acid basis.

AMINO ACID POLYMER COMPOSITION DETERMINATION

Polymer (100 mg.) is hydrolyzed with 25 ml. of 6-normal hydrochloric acid under reflux for 6 hours, and the dinitrophenylamino acid derivatives are prepared as in J.A.C.S. 76; 1328 (1954), as follows. After concentration under reduced pressure, water is added and the process is repeated to remove unbound hydrochloric acid. The residue is neutralized to pH 7 with aqueous sodium bicarbonate solution. To this mixture, which usually is of about 5 ml. volume, is added 0.4 g. of sodium bicarbonate, 0.4 g. (2.2 millimoles, 0.28 ml.) of 2,4-dinitrofluorobenzene and 10 ml. of ethanol. After 2 hr. of mechanical shaking and 12 hr. of standing in the dark, the ethanol is evaporated under reduced pressure at 40° C. to approximately one-fourth the original volume. The liquid is acidified with 2-normal hydrochloric acid and extracted thrice with ethyl acetate. After the ethyl acetate is evaporated, 10 ml. of chloroform-ether (2:1) is added and the resulting dinitrophenyl-amino acid derivatives and dinitrophenol are separated from one another by chromatography on Hyflo Supercel diatomaceous silica, as described in Nature 167: 513 (1951). The absorbent is prepared by treating it with 0.2 molar buffer (sodium dihydrogen phosphate and citric acid, pH 4) and packing it solidly into a tube of 8 mm. internal diameter and 25 cm. length. The column is charged with the chloroform-ether solution and the individual bands of dinitrophenylglycine and the dinitrophenylglutamic acid compounds are separated, and the solvent is evaporated. Each fraction is eluted with 1.5 percent sodium bicarbonate solution and centrifuged to separate traces of silica carried along. The optical density of each of these solutions is read on a Beckman spectrophotometer at 360 mμ and compared with a standard solution of the dinitrophenyl-amino acid compound in order to estimate the amount.

ESTIMATION OF PROPORTIONS OF N-GLUTAMIC ACID AND N-GLYCINE

Dinitrophenyl derivative of amino acid polymer (60 to 100 mg.) is hydrolyzed with 25 ml. of 6-normal hydrochloric acid under reflux for 12 hrs. in the dark. The solution is diluted with an equal volume of water, extracted by ethyl acetate, the ethyl acetate is evaporated, and the residue is dissolved in chloroform-ether. The dinitrophenyl-amino acid derivatives are separated by chromatography and estimated as described earlier, with the superposition of corrections calculated from recovery experiments with dinitrophenylglutamic acid and dinitrophenylglycine polymers hydrolyzed under the same conditions as dinitrophenyl-polymer; F. Sanger, Biochem. J. 39, 507 (1945).

ESTIMATION OF AVERAGE MOLECULAR WEIGHT OF PEPTIDE CHAIN

The analytical procedure is the same as for assay of N-amino acids; W. R. Middlebrook, Biochim. Biophys. Acta 7: 547 (1951). The molecular weights are calculated on the basis of a polymer consisting of 25 mole percent glutamic acid residue and 75 percent glycine residue. This calculation assumes no fragmentation of polymer molecule during the dinitrophenylation, no cyclopeptide, and no N-terminal pyroglutamic acid.

In order to check on whether the amino group assessed by the dinitrofluorobenzene might arise from a pyroglutamyl residue opened by the dinitrophenylation, the dinitrophenylation procedure was carried out on an authentic sample of DL-pyroglutamic acid. No colored product other than dinitrophenol was obtained.

What is claimed is:

1. Method for making a polypeptide by heating a mixture which consists of glutamic acid and at least one other α-amino carboxylic acid of the group consisting of neutral and basic amino acids at temperatures ranging between about 160° and about 210° C. until a polypeptide has formed.

2. Method of claim 1, wherein the glutamic acid is heat-polymerized with glycine.

3. Method of claim 1, wherein the glutamic acid is first heated to form a melt of pyroglutamic acid.

4. Method of claim 1, wherein a substantially equimolar amount, amino acid basis, of aqueous 85 percent phosphoric acid is added and the reaction temperature ranges between about 140° and 210° C.

References Cited in the file of this patent

UNITED STATES PATENTS

| | | |
|---|---|---|
| 2,071,253 | Carothers | Feb. 16, 1937 |
| 2,293,388 | Hanford | Aug. 18, 1942 |

OTHER REFERENCES

Schaal: Annalen der Chemie, vol. 157, pp. 24–34 (1871).

Bamford et al.: Synthetic Polypeptides (1956), pp. 10, 11, 15, 16, 324–332 and 372, published by Academic Press, Inc., N.Y.

Harado et al.: J.A.C.S., vol. 80 (July 5, 1958), pages 2694–2697.